United States Patent [19]
Elorriaga et al.

[11] Patent Number: 6,102,307
[45] Date of Patent: Aug. 15, 2000

[54] LOAD STRUT FOR A VARIABLE GEOMETRY NOZZLE

[75] Inventors: Javier Elorriaga, Getxo; Luis Martin, Bilbao; Daniel Ikaza, Berango, all of Spain

[73] Assignee: Industria de Turbo Propulsores, S.A., Zamudio, Spain

[21] Appl. No.: 09/096,839

[22] Filed: Jun. 12, 1998

[30] Foreign Application Priority Data

Jun. 16, 1997 [EP] European Pat. Off. .............. 97500105

[51] Int. Cl.$^7$ ................................... D05B 12/00
[52] U.S. Cl. ............................ 239/265.39; 239/265.41; 239/265.43
[58] Field of Search ........................ 239/265.39, 265.41, 239/265.43; 60/228, 230, 232, 271

[56] References Cited

U.S. PATENT DOCUMENTS

| | | | |
|---|---|---|---|
| 5,261,605 | 11/1993 | McLafferty et al. ............... | 239/265.35 |
| 5,261,606 | 11/1993 | Barcza . | |
| 5,269,467 | 12/1993 | Williams et al. . | |
| 5,398,499 | 3/1995 | Urruela ...................................... | 60/232 |
| 5,485,959 | 1/1996 | Wood et al. ......................... | 239/265.41 |
| 5,779,152 | 7/1998 | Renggli et al. ..................... | 239/265.33 |
| 5,820,024 | 10/1998 | Ausdenmoore et al. .......... | 239/265.35 |
| 5,839,663 | 11/1998 | Broadway et al. ................. | 239/365.35 |

FOREIGN PATENT DOCUMENTS 0512 833 A1  5/1992  European Pat. Off. .

*Primary Examiner*—Teresa Walberg
*Assistant Examiner*—Vinod D. Patel
*Attorney, Agent, or Firm*—Darby & Darby

[57] ABSTRACT

A load strut for divergent master petals of variable geometry nozzles, of the type which exhibit a control system constituted by three ring-like pieces, the external ring piece being divided into two half-rings, which joins the two half-rings and the corresponding divergent master petal, and which may comprise two bars joined at one end by means of spherical or universal joints to the external ring, and joined to one another, by means of a cylindrical joint, substantially perpendicular to the plane which contains the center lines of both bars and by a divergent master petal-binding transition piece, joined to the two bars by means of cylindrical joints, with sufficient clearance to allow the changes in distance between the ends of the two bars.

2 Claims, 6 Drawing Sheets

LOAD STRUT FOR A VARIABLE GEOMETRY NOZZLE

FIELD OF THE INVENTION

The invention relates to gas turbine engines and in particular to a load strut for a divergent master petal of variable geometry nozzles.

BACKGROUND OF THE INVENTION

Gas turbine engines for aircraft achieve thrust by discharging hot gas through the exhaust nozzle.

A variable area convergent/divergent nozzle is necessary in order to achieve good efficiency for multi-mission applications. The maximum efficiency is obtained with independent control of the exhaust nozzle throat and exit areas. With this, the maximum expansion of the gases and therefore maximum thrust is achieved at all times.

One of the goals of the designers is to increase the aircraft's maneuverability, in those flight conditions in which the aerodynamic control surfaces begin to lose their efficiency. A way of achieving this goal is by vectoring the gas from the axial direction to achieve a thrust component which is up, down or sideways. At present, there are several solutions with two-dimensional convergent/divergent nozzles, such as that disclosed in U.S. Pat. No. 4,763,840. But these nozzles can only orient the gas in one direction (generally pitch) and they are heavier than the axisymmetric convergent/divergent nozzles.

There are different systems of 3-D thrust vectoring convergent/divergent nozzles. All these systems can be classified into three major groups:

Those systems that orient the whole exhaust nozzle upstream of the convergent section. Due to the fact that the alteration of the geometry is done upstream of the throat, perturbations are induced in the turbine. Moreover, a highly complicated sealing device is required.

Those systems that orient the flow at the outlet itself of the exhaust nozzle more downstream of the nozzle. With these systems there is an efficiency reduction and increased weight due to the additional device required.

Those systems that orient the divergent segment of the exhaust nozzle. With these systems the perturbation upstream of the turbine is minimized. The increase in weight is less than in the previous case, due to the fact that the nozzle itself orients the flow without the help of any other additional device.

Within this third group, the most common embodiment includes, for example, as shown in U.S. Pat. No. 5,082,182, a convergent section that consists of a plurality of master petals and a plurality of slave petals in order to provide an adequate sealing. The throat area is governed by the well known mechanism of cams, rollers or other mechanisms, such as perimetric mechanism. The control of the throat area requires a number of linear actuators.

Downstream of this convergent section there is a divergent section consisting of the same plurality of divergent master petals and a plurality of slave petals in order to provide an adequate sealing. The divergent master petals are connected to convergent master petals by universal linkages. The linkages permit the lateral and radial motion of the divergent master petals allowing orientation of the flow.

The divergent master petals are linked to an external ring by load struts. The connection of the strut to the divergent master petal is carried out via a spherical linkage, while the connection to the external ring is made via a cylindrical linkage.

Both outlet area and flow orientation is controlled by the external ring. This external ring requires at least three linear actuators.

With this embodiment, two independent actuator systems are required, internal and external.

Another variable geometry nozzle is disclosed in EP 0557229B1, characterized by the fact that it controls the throat area, outlet area and flow orientation only with a set of linear actuators. That supposes a reduction in cost and a more simple design of the actuator system.

This single system consists of three rings, concentric among themselves and with the axis of the turbine, and a plurality of linear actuators linked by their upstream end to the structure of the turbine.

The rings mentioned above are connected together and to the structure of the turbine via linkage elements and guide devices which allow the joint axial displacement of the three rings in equal magnitude, with respect to the structure of the turbine, as well as a relative rotary movement of the intermediate and external rings between themselves and with respect to the internal ring, thereby allowing the external ring to be inclined in any direction with respect to the center of rotation in the axis of the turbine.

The convergent master petals are connected at a point in their upstream segment to the internal ring by cylindrical linkages, tangential to a theoretical circumference which is concentric to the longitudinal axis of the engine and located in a theoretical plane perpendicular to such longitudinal axis.

The master petals of the divergent section are subdivided transversely into at least two segments that are connected to each other by a cylindrical linkage perpendicular to that of a linkage between the master petal of the convergent and divergent sections. The divergent master petals are connected at a point in their upstream segment to the master convergent petals by cylindrical linkages, parallel to the linkage between the internal ring and the master convergent petals. The downstream segment is connected to the external ring via a load strut that links to that segment by a spherical linkage and to the external ring by a cylindrical linkage, tangential to a theoretical circumference which is concentric to the longitudinal axis of the engine and located in a theoretical plane perpendicular to such longitudinal axis. The invention is related to said load strut.

The external ring is connected to downstream ends of the linear actuators by spherical linkages. The external ring is divided into two half rings that are connected to each other by a cylindrical linkage, perpendicular to the theoretical axis of the engine. The linkage between the half rings mentioned allows a relative rotary movement of the external half rings between themselves achieving the outlet control or allowing the external ring to be inclined in any direction with respect to the center of rotation in the axis of the turbine as a unitary ring, orienting the flow in any direction.

In patent EP 0557229B1 the master petals are distributed in a way that half of them are connected to one of the two external half rings via a load strut, and the other half are connected to the other external half ring.

This distribution limits outlet control due to petal interferences and sealing problems. If two of the master petals are located in the linkage between the two external half ring, the limitation of outlet control is reduced.

This new distribution of the petals needs a different load strut. The new load strut must allow that the divergent master petals are connected to both external half rings at the same time.

SUMMARY OF THE INVENTION

The object of the present invention is to provide a load strut that permits connection of a divergent master petal to both external half rings at the same time.

If the two external half rings move together as a unitary external ring, the load strut has to work in the same way as a load strut that connects a divergent master petal to a single external ring.

If there is relative rotary movement between both external half rings, the theoretical symmetric plane of the load strut has to be the same as the bisector plane formed by the two external half rings maintaining the linkage with the divergent master petal in said plane.

Accordingly, the device of the present invention comprises two bars that are connected to each other at a point downstream by a cylindrical linkage. Each bar is connected at a point upstream by a spherical or universal linkage to an external half ring.

The relative position of both bars is fixed by the linkages and the position of the external half rings, forming a unit. This unit has only one degree of freedom, similar to the other conventional load struts. Said degree of freedom is the rotation about the axis formed by the theoretical line through the two spherical or universal linkages.

In order to join the two bars to the master divergent petal, a transition part is necessary. This transition part is connected by a cylindrical linkage to each bar. These linkages are essentially parallel to the linkage between the two bars. The three cylindrical linkages are essentially coplanar. In such form, when there is a relative motion between both external half rings, there is a relative motion between both bars and then the distance between both cylindrical linkages of the transition part changes slightly. Due to the alignment of the three cylindrical linkages, the mentioned variation is a function of (1-cos) of the rotation angle, since this angle is very small. The cylindrical linkage clearances allow this slight variation of the distance.

The load strut that is the object of the invention comprises the two bars and the transition part. The linkage between the load strut and the divergent master petal can be the same as a conventional load strut.

DETAILED DESCRIPTION OF THE PREFERRED EMBODIMENTS

Figure 1:
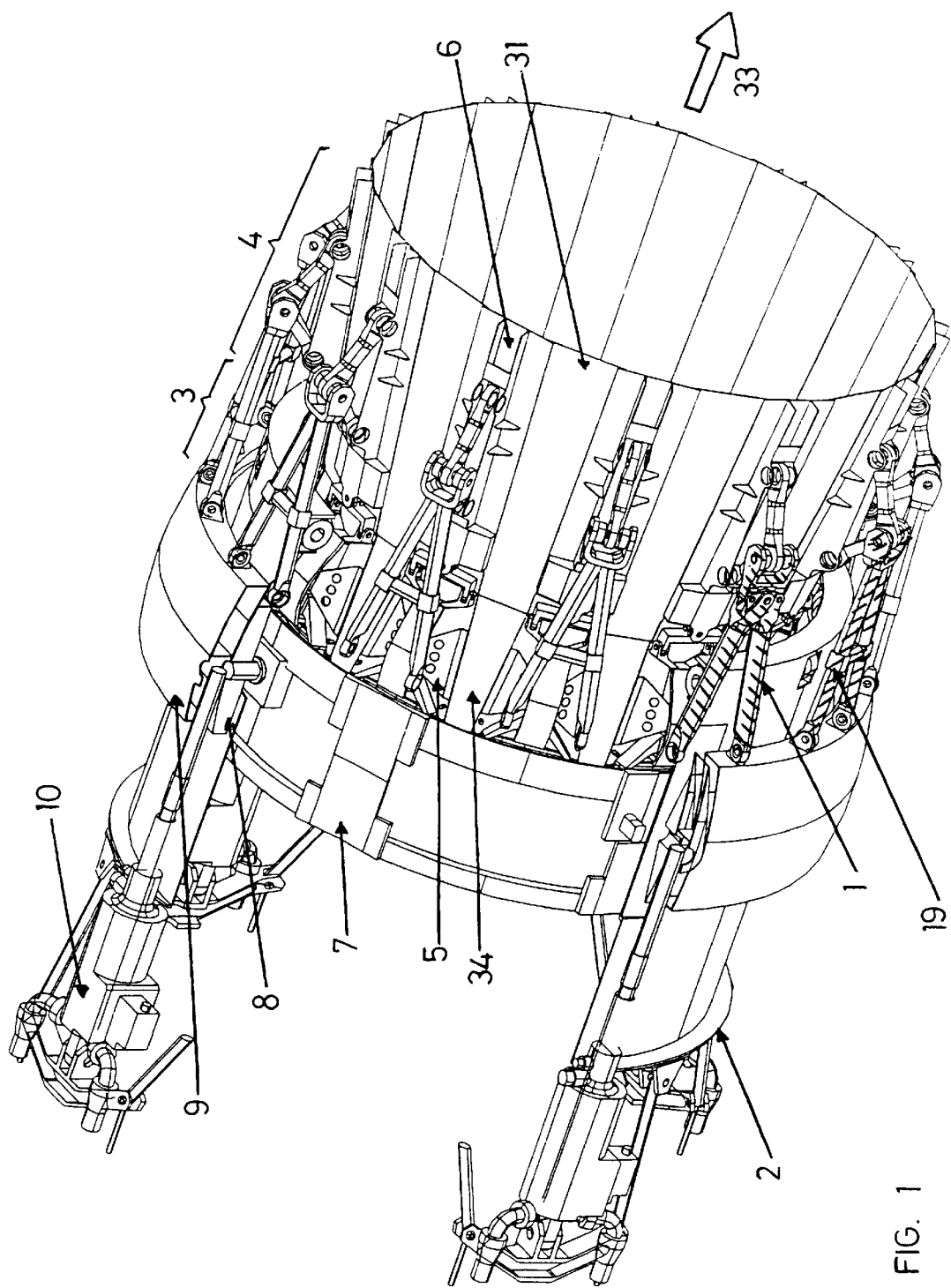
FIG. 1 is a perspective of an exhaust nozzle associated with the invention.

FIG. 1 represents, in a diagrammatic and partially cross-sectional perspective view, an exhaust nozzle that has a load strut 1 in accordance with the invention, with arrow 33 showing the direction of the exhaust flow. As with traditional exhaust nozzles, the nozzle represented in FIG. 1 includes a casing 2, a convergent section 3, and a divergent section 4. The convergent section 3 consists of a plurality of convergent master petals 5 and convergent slave petals 34. Similarly, the divergent section 4 consists of a plurality of divergent master petals 6 and divergent slave petals 31.

The variation in the throat area, defined by the downstream end contour of the convergent petals; the outlet area, defined by the downstream end contour of the divergent petals; and the vectoring of the thrust are controlled by a system consisting of three rings 7,8,9, concentric with each other and with the axis of the turbine. The external ring 9 is divided in two external half rings. Only one of the two external half ring is represented in FIG. 1. The position of the rings 7, 8, 9 is controlled by a plurality of linear actuators 10 which are linked by their upstream ends to the casing 2. If the vectoring of the thrust is not required, the intermediate ring 8 can be removed.

The rings 7, 8, 9 are also linked to each other by devices that allow axial displacement of the set of three rings, in equal magnitude, with respect to the casing 2 of the turbine, as well as a relative rotary movement of the intermediate ring 8 and external half rings 9 between themselves and with respect to the internal ring 7, in such way that allows the external half rings 9 to incline in any direction, and a relative rotatory movement of the external half rings 9 between themselves.

Figure 2:
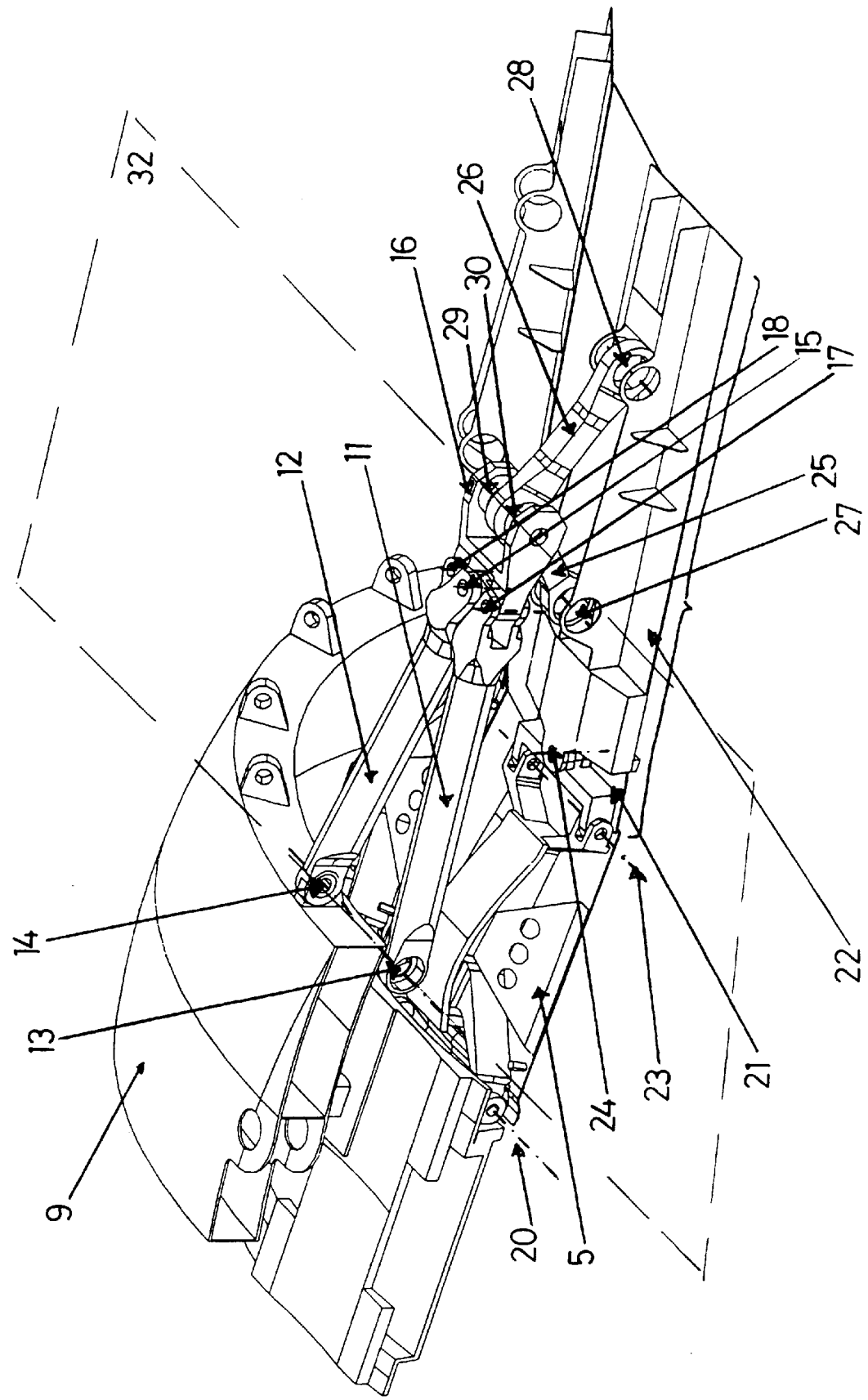
FIG. 2 is a perspective of a detail of the nozzle when the load strut according to the invention is present.

FIG. 2 represents a perspective of a detail of the nozzle when the load strut 1 according to the invention is present. The load strut comprises two bars 11,12. Each bar is connected at its upstream end by a spherical or universal linkage 13,14 to an external half ring and the bars are connected to each other at their downstream ends by a cylindrical linkage 15, this cylindrical linkage 15 is perpendicular to a theoretical plane 32 that contains both bars 11,12. The mentioned plane is formed by the center of the spherical linkages 13,14 and the cylindrical linkage 15. In such way, the relative position of both bars 11, 12 is fixed by the linkages 13, 14, 15 and the position of the external half rings 9, forming a unit. This unit has only one degree of freedom, similar to the other conventional load struts 19. The one degree of freedom is the rotation about the axis formed by the theoretical line through the two spherical or universal linkages 13, 14.

The transition part 16 is connected by cylindrical linkages 17, 18 to the bars 11, 12 respectively. The axis of the linkages 17, 18 are generally parallel to the axis of the linkage 15. The three cylindrical linkages 15, 17, 18 are preferably generally coplanar. The linkage between the transition part 16 and the divergent master petal can be the same as a conventional load strut 19.

The convergent master petals 5 are connected at a point upstream to the internal ring 7 by cylindrical linkages 20, tangential to a theoretical circumference which is concentric to the longitudinal axis of the engine and located in a theoretical plane perpendicular to such longitudinal axis.

The master divergent petals 6 are subdivided transversely into at least two segments. The upstream segment 21 is connected at a point in its upstream segment to the master convergent petals by cylindrical linkages 23, tangential to a theoretical circumference which is concentric to the longitudinal axis of the engine and located in a theoretical plane perpendicular to such longitudinal axis. The downstream segment 22 is connected to the upstream segment 21 by a cylindrical linkage 24 perpendicular to the master divergent base.

The divergent master petal 6 is connected to the load strut 1 or 19 by two intermediate bars 25, 26. These intermediate bars 25, 26 are connected to the divergent master petal 6 by spherical linkages 27, 28. The intermediate bar located downstream 26 is connected to the load strut 1 or 19 by a spherical linkage 29 and the intermediate bar located upstream 25 is connected to the load strut 1 or 19 by a cylindrical linkage 30.

Figure 3:
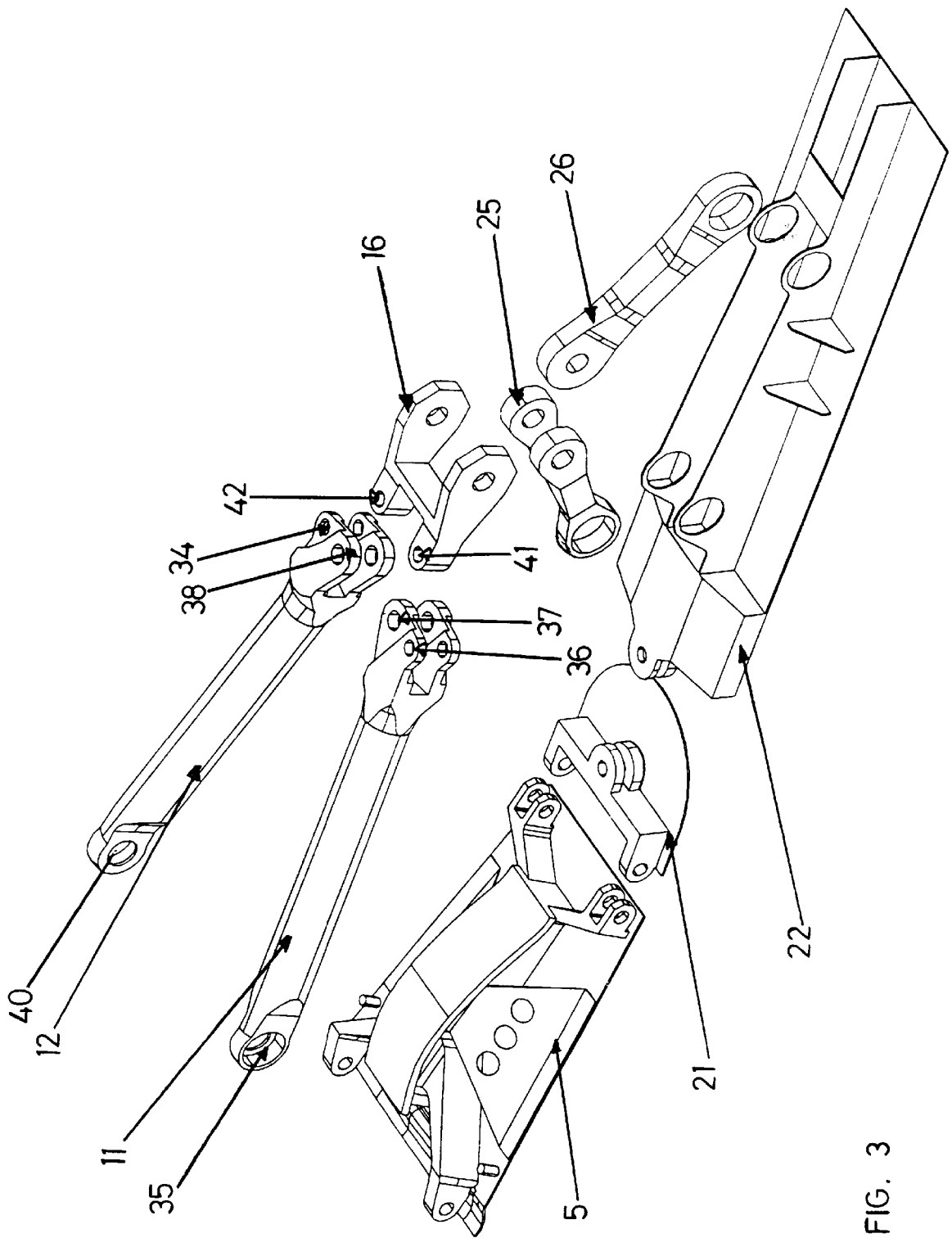
FIG. 3 is an exploded perspective showing the load strut according to the invention.

FIG. 3 is an exploded perspective showing the load strut related with the invention. The invention comprises two bars 11, 12 and a transition part 16.

Bar 11 has at one end a lug 35, that is designed to receive a spherical linkage 13. That linkage joins the bar 11 with one external half ring 9*a*. The other end has two lugs 36, 37. One of the lugs 37 is connected to the lug 38 of the other bar 12 by a cylindrical linkage 15. Similarly, the other bar 12 has at one end a lug 40, that is designed to receive a spherical linkage 14. That linkage joins the bar 12 with the other external half ring 9*b*.

The other lug 36 of the bar 11 is connected to the lug 41 of the transition part 16 by a cylindrical linkage 17. Similarly, the other lug 39 of the bar 12 is connected to the lug 42 of the transition part 16 by a cylindrical linkage 18.

The design of the bars 11, 12 could be made in such way that both bars would be equal, which would reduce the costs of design, manufacturing and maintenance.

Figure 4:
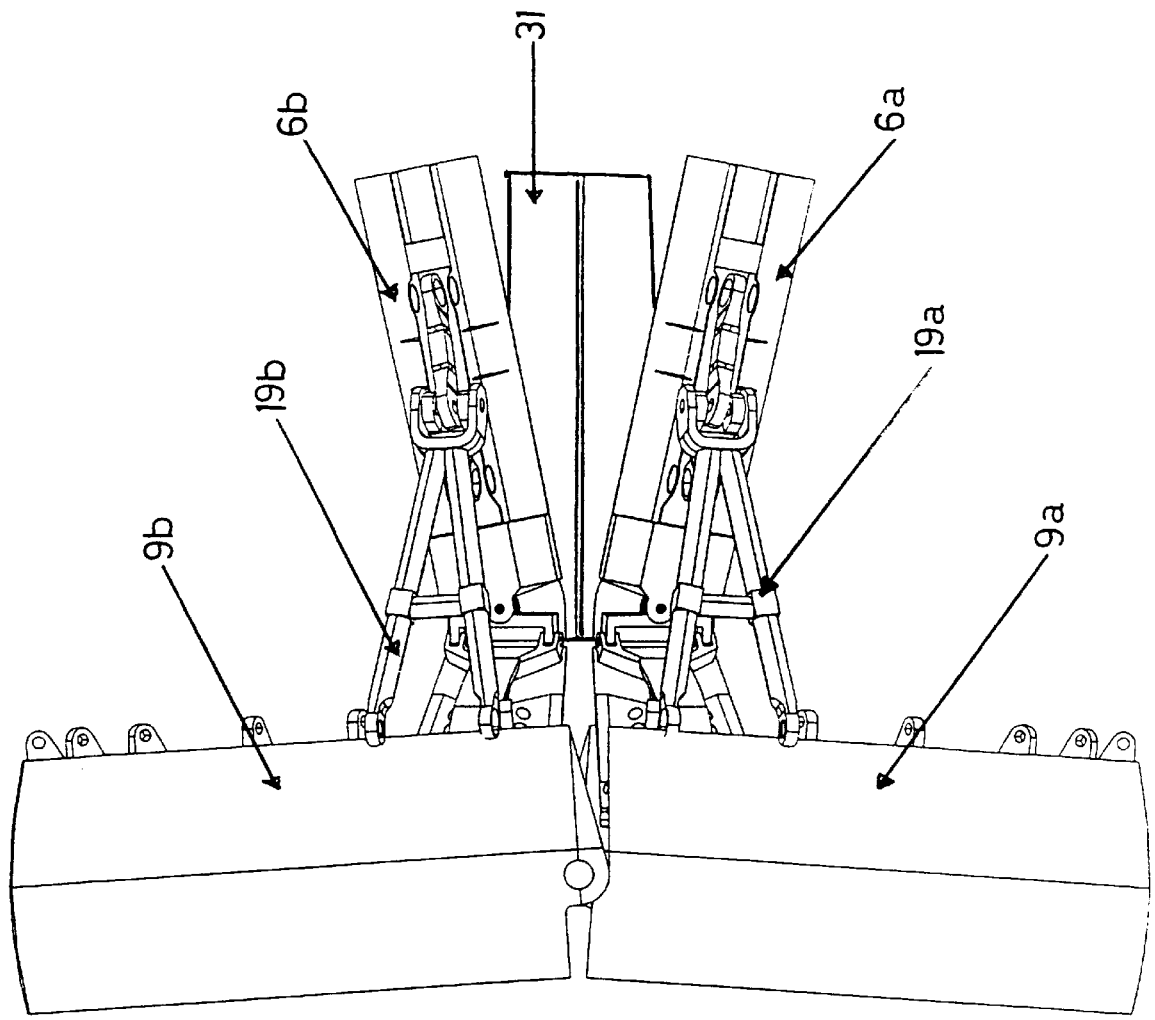
FIG. 4 is a view showing sealing problems in a nozzle in accordance with the patent EP 0557229B1.

FIG. 4 shows a relative rotation between both external half rings 9 in accordance with the patent EP 0557229B1. The divergent master petal 6*a* rotates clockwise and the divergent master petal 6*b* rotates counter-clockwise. These rotations cause a big gap between the divergent master petals 6*a*,6*b* that the divergent slave petal 31 has to cover. With even a small angle of rotation, the gap is too big and there is a sealing problem.

Figure 5:
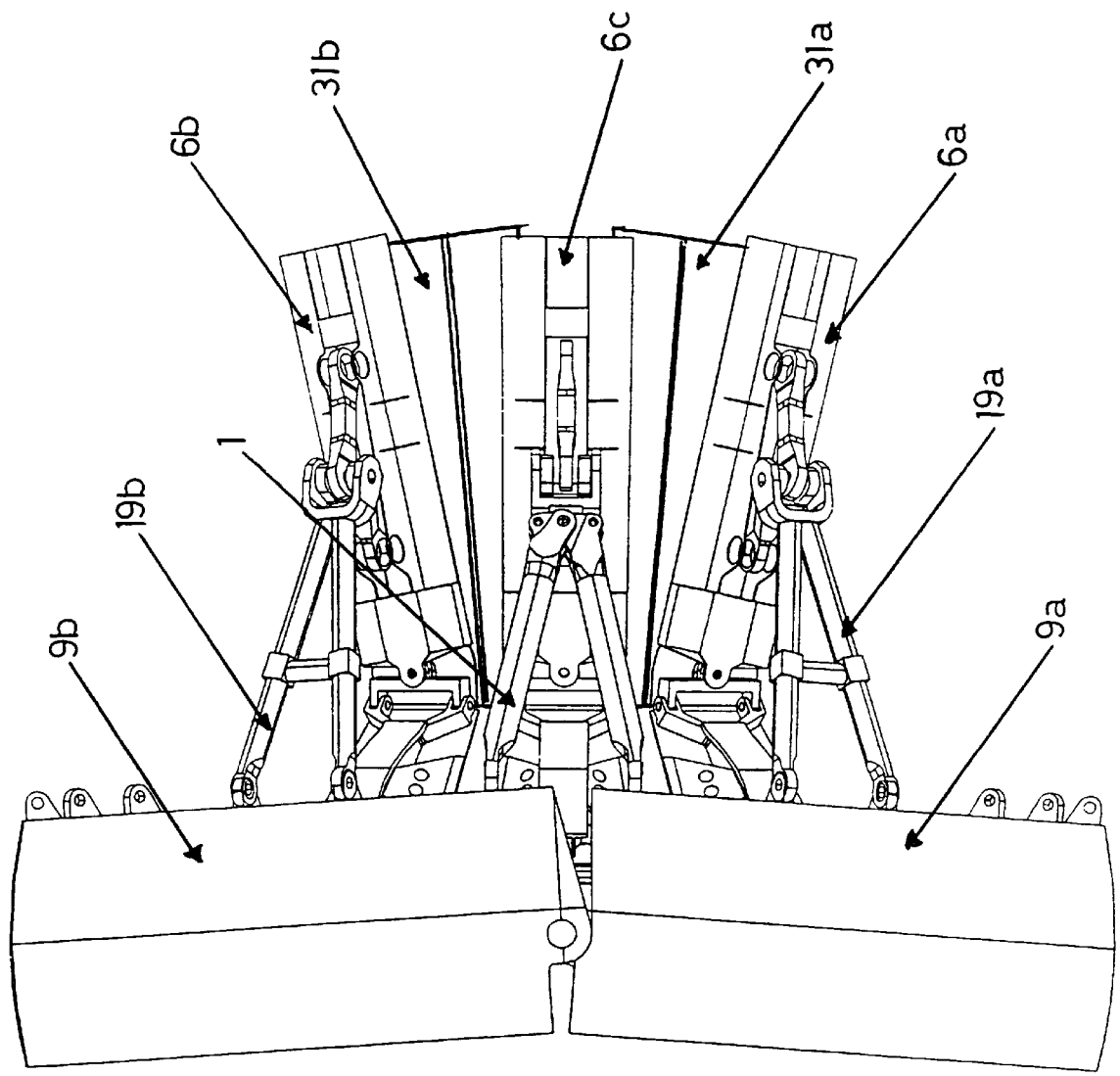
FIG. 5 is a view showing the absence of sealing problems in a nozzle in accordance with the patent EP 0557229B1 using the load strut of the invention.

FIG. 5 shows the same rotation between both external half rings 9 as FIG. 4 in accordance with the patent EP 0557229B1, but using the load strut 1 of the invention. In the same way as above, the divergent master petal 6*a* rotates clockwise and the divergent master petal 6*b* rotates counter-clockwise, but now there is a divergent master petal 6*c* that remains at the same position. The gap between divergent master petals 6*a*, 6*b* is therefore distributed to two divergent slave petals 31*a*, 31*b* without sealing problems. A much bigger relative rotation between both external half rings 9*a*. 9*b* is possible without any sealing problems. The variation range of the nozzle outlet area is bigger due to a bigger allowable relative rotation between both external half rings 9*a* and 9*b*.

When there is a relative motion between both external half rings 9, there is a relative motion between both bars 11, 12 and then the distance between both cylindrical linkages 17,18 of the transition part 16 changes slightly. However, the cylindrical linkage clearances preferably allow for this slight variation of the distance.

Figure 6:
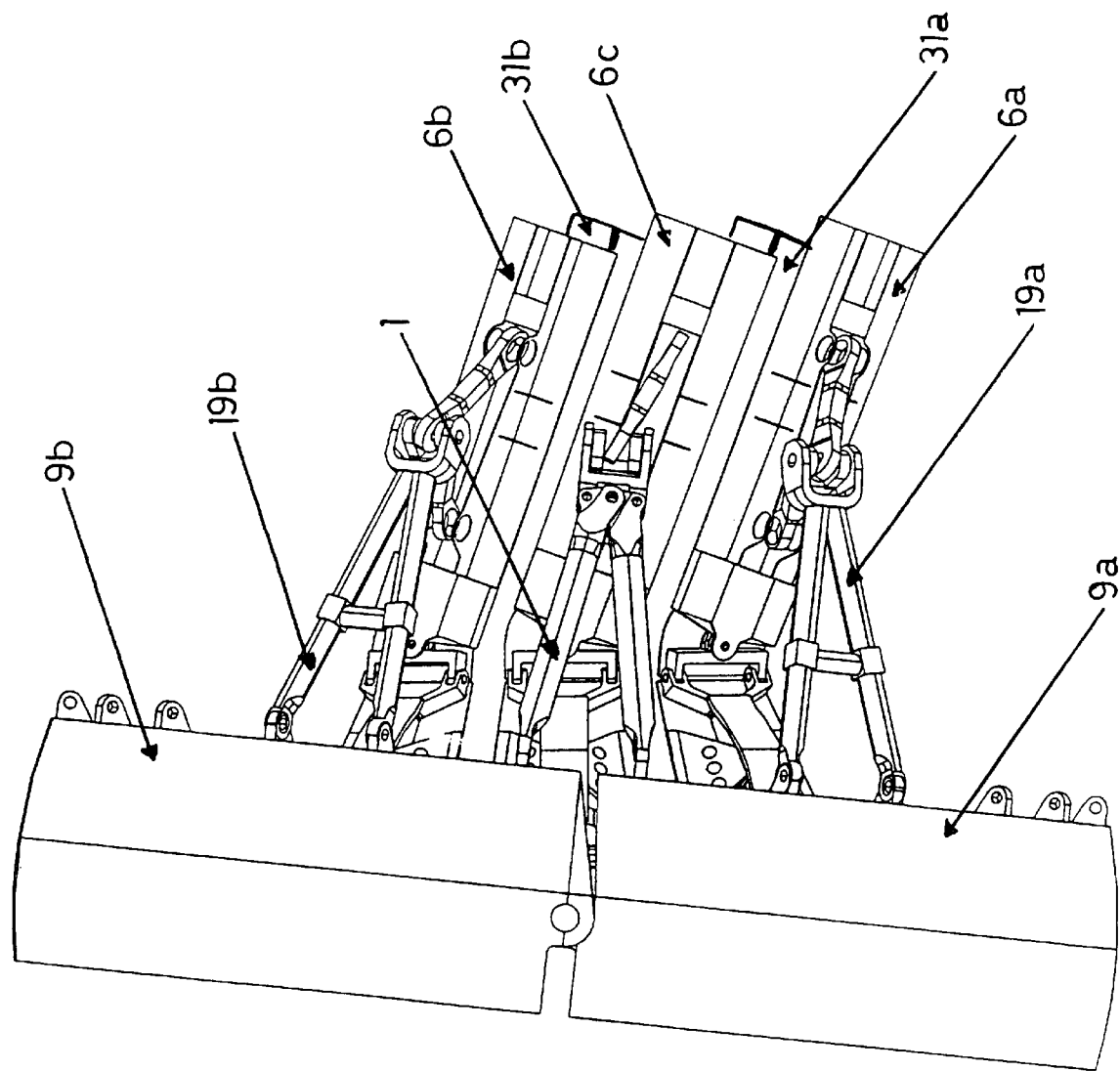
FIG. 6 is a view showing a nozzle in accordance with the patent EP 0557229B1 using the load strut of the invention orienting the flow.

FIG. 6 shows the rotation of both external half rings 9*a*, 9*b* together relative to the internal ring 7. In such case, there is no relative motion between both external half rings 9 and hence between both load strut bars 11, 12. Then the load strut 1 works as a conventional load strut 19.

It is therefore seen that the load strut of the insertion achieves the objects of the invention, including the reduction of sealing problems. It is to be understood that the embodiments are shown for the purposes of illustration and not limitation, the claims being limited only by the claims, as follows:

What is claimed is:

1. A load strut for a divergent master petal of variable geometry nozzles of gas turbine engines, the strut being located in linkage between two external half rings which form an external ring;

wherein the strut is linked to both the external half rings and the master divergent petal.

2. The load strut according to claim 1 further comprising:

two bars connected to the external half ring;

one of a spherical and universal linkage connected to the external half ring and the two bars at a distal point;

a cylindrical linkage connected to the two bars, said cylindrical linkage being substantially perpendicular to a plane containing longitudinal center lines of the two bars;

a transition part connected to each of the two bars by a respective cylindrical linkage, said transition part being substantially parallel and coplanar to the linkage between the bars;

wherein the transition part is coupled to the divergent master pedal, and the cylindrical linkages have a clearance which permits distance variation between the two bar ends.

\* \* \* \* \*